United States Patent [19]

Campbell

[11] 4,125,525

[45] Nov. 14, 1978

[54] AROMATIC SULFIDE/SULFONE POLYMER PRODUCTION

[75] Inventor: Robert W. Campbell, Bartlesville, Okla.

[73] Assignee: Phillips Petroleum Company, Bartlesville, Okla.

[21] Appl. No.: 698,575

[22] Filed: Jun. 22, 1976

[51] Int. Cl.² ............................................. C08F 28/00
[52] U.S. Cl. .................................... 528/388; 528/174
[58] Field of Search .......... 260/79, 79.3 M, 79.3 MU, 260/49, 79.1

[56] References Cited

U.S. PATENT DOCUMENTS

| | | | |
|---|---|---|---|
| 3,354,129 | 11/1967 | Edmonds et al. | 260/79 |
| 3,780,000 | 12/1973 | Feasey et al. | 260/79.3 M |
| 3,867,356 | 2/1975 | Campbell | 260/79 |
| 3,884,884 | 5/1975 | Scoggins et al. | 260/79 |
| 3,919,177 | 11/1975 | Campbell | 260/79 |
| 4,016,145 | 4/1977 | Campbell | 260/79 |

FOREIGN PATENT DOCUMENTS 1,153,035  5/1969  United Kingdom ...................... 260/79

*Primary Examiner*—Ronald W. Griffin

[57] ABSTRACT

High molecular weight aromatic sulfide/sulfone polymers are produced by contacting a dihalo aromatic sulfone, an alkali metal sulfide other than lithium sulfide, and an alkali metal carboxylate in a sulfone diluent. Use of the alkali metal carboxylate results in polymers of high molecular weight having utility as coatings, films, molded objects, fibers, filaments, and the like.

6 Claims, No Drawings

AROMATIC SULFIDE/SULFONE POLYMER PRODUCTION

This invention relates to the production of polymers from aromatic compounds. In accordance with another aspect, this invention relates to a process for the production of high molecular weight aromatic sulfide/sulfone polymers by contacting a dihalo aromatic sulfone, a selected alkali metal sulfide, and an alkali metal carboxylate in a sulfone diluent. In accordance with a further aspect, this invention relates to the production of p-phenylene sulfide/sulfone polymers by contacting a bis(p-halophenyl) sulfone, a selected alkali metal sulfide, and an alkali metal carboxylate in the presence of a sulfone diluent.

In recent years, a wide variety of high polymers has been prepared, many of which are currently being introduced and marketed on a large scale. While such polymers are useful in many areas, one property of high polymers, particularly those of the thermoplastic type, which needs to be improved is ability to withstand high temperature. Since thermoplastic materials can be molded rapidly and efficiently into almost any desired shape, they lend themselves to mass production. The high polymer, especially thermoplastic material, which could stand very high temperatures and thus could be used in such areas as electrical components, wire coatings, automotive parts, and the like, has been the objective of a great deal of research.

This invention provides a method for producing high molecular weight aromatic sulfide/sulfone polymers. These polymers are more desirable as molding resins than are aromatic sulfide/sulfone polymers of lower molecular weight since properties of the product molded from the polymer of higher molecular weight are superior.

Accordingly, an object of this invention is to produce aromatic sulfide/sulfone polymers exhibiting high molecular weight.

It is another object of this invention to provide a method employing a specific type of compound for the preparation of aromatic sulfide/sulfone polymers of increased molecular weight suitable for molding.

Other objects and aspects, as well as the several advantages of this invention, are apparent from a study of this disclosure and the appended claims.

In accordance with this invention, in the production of an aromatic sulfide/sulfone polymer by employing a dihalo aromatic sulfone, an alkali metal sulfide other than lithium sulfide, and a sulfone diluent, the use, additionally, of an alkali metal carboxylate results in an aromatic sulfide/sulfone polymer of higher molecular weight, as evidenced by a higher inherent viscosity, than that obtained without the use of the alkali metal carboxylate.

In one embodiment of the present invention, at least one dihalo aromatic sulfone such as a bis(p-halophenyl) sulfone, at least one alkali metal sulfide other than lithium sulfide, at least one alkali metal carboxylate, and at least one sulfone diluent are contacted under polymerization conditions for a period of time sufficient to form an aromatic sulfide/sulfone polymer.

In accordance with this invention, in the production of an aromatic sulfide/sulfone polymer by employing a dihalo aromatic sulfone, an alkali metal sulfide selected from sodium sulfide, potassium sulfide, rubidium sulfide, and cesium sulfide, and a sulfone diluent, the use, additionally, of an alkali metal carboxylate results in an aromatic sulfide/sulfone polymer of higher molecular weight, as evidenced by a higher inherent viscosity, than that obtained without the use of the alkali metal carboxylate. As used herein, the terms "dihalo aromatic sulfone" and "sulfone diluent" represent substances which are different from each other; the sulfone diluent has no halogen substituent.

In one embodiment of the present invention, at least one dihalo aromatic sulfone, at least one alkali metal sulfide selected from the group consisting of sodium sulfide, potassium sulfide, rubidium sulfide, and cesium sulfide, at least one alkali metal carboxylate, and at least one sulfone diluent are contacted under polymerization conditions for a period of time sufficient to form an aromatic sulfide/sulfone polymer.

Dihalo aromatic sulfones that can be employed in the process of this invention can be represented by the formula

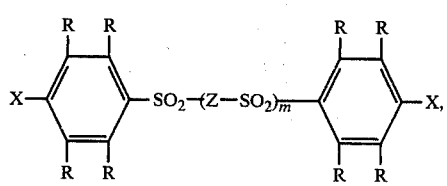

where each X is selected from the group consisting of fluorine, chlorine, bromine, and iodine; Z is a divalent radical selected from the group consisting of

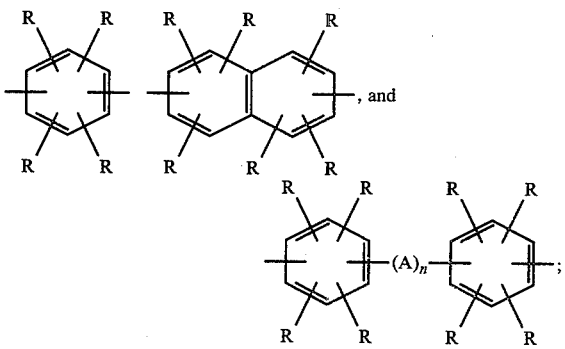

$m$ is 0 or 1; $n$ is 0 or 1; A is selected from the group consisting of oxygen, sulfur, sulfonyl, and $CR_2$; and each R is selected from the group consisting of hydrogen and alkyl radicals having 1 to about 4 carbon atoms, the total number of carbon atoms in all of the R groups in the molecule being 0 to about 12. Preferably, $m$ is 0.

Examples of some dihalo aromatic sulfones that can be employed in the process of this invention include bis(p-fluorophenyl) sulfone, bis(p-chlorophenyl) sulfone, bis(p-bromophenyl) sulfone, bis(p-iodophenyl) sulfone, p-chlorophenyl p-bromophenyl sulfone, p-iodophenyl 3-methyl-4-fluorophenyl sulfone, bis(2-methyl-4-chlorophenyl) sulfone, bis(2,5-diethyl-4-bromophenyl) sulfone, bis(3-isopropyl-4-iodophenyl) sulfone, bis(2,5-dipropyl-4-chlorophenyl) sulfone, bis(2-butyl-4-fluorophenyl) sulfone, bis(2,3,5,6-tetramethyl-4-chlorophenyl) sulfone, 2-isobutyl-4-chlorophenyl 3-butyl-4-bromophenyl sulfone, 1,4-bis(p-chlorophenylsulfonyl)benzene, 1-methyl-2,4-bis(p-fluorophenylsulfonyl)benzene, 2,6-bis(bromophenylsulfonyl)naphthalene, 7-ethyl-1,5-bis(p-iodophenylsulfonyl)naphthalene, 4,4'-bis(p-chlorophenylsulfonyl)biphenyl, bis[p-(p-bromophenylsulfonyl)phenyl] ether, bis[p-(p-chlorophenylsulfonyl)phenyl] sulfide, bis[p-(p-chlorophenylsulfonyl)phenyl] sulfone, bis[p-(p-bromophenylsulfonyl)phenyl]methane, 5,5-bis[3-ethyl-4-(p-chlorophenylsulfonyl)phenyl]nonane, and the like, and mixtures thereof.

As indicated above, alkali metal sulfides that can be employed in the process of this invention include sodium sulfide, potassium sulfide, rubidium sulfide, cesium sulfide, and mixtures thereof. The alkali metal sulfide can be used in anhydrous form, as a hydrate, or as an aqueous mixture. Preferably, the alkali metal sulfide is employed in hydrated form.

Alkali metal carboxylates that can be employed in the process of this invention can be represented by the formula R'CO$_2$M, where R' is a hydrocarbyl radical selected from the group consisting of alkyl, cycloalkyl, and aryl, and combinations thereof such as alkaryl, aralkyl, and the like, the number of carbon atoms in said R' being within the range of 1 to about 20, and M is an alkali metal selected from the group consisting of lithium, sodium, potassium, rubidium, and cesium. Preferably, R' is an alkyl radical having 1 to about 6 carbon atoms or a phenyl radical and M is lithium. If desired, the alkali metal carboxylate can be employed as a hydrate or as a solution or dispersion in water.

Examples of some alkali metal carboxylates that can be employed in the process of this invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octadecanoate, sodium heneicosanoate, lithium cyclohexanecarboxylate, cesium cyclododecanecarboxylate, sodium 3-methylcyclopentanecarboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolylacetate, lithum 4-ethylcyclohexylacetate, and the like, and mixtures thereof.

Sulfone diluents that can be employed in the process of this invention can be represented by the formula R"SO$_2$R", where each R" is a hydrocarbyl radical selected from the group consisting of alkyl, cycloalkyl, and aryl, and combinations thereof such as alkaryl, aralkyl, and the like, the number of carbon atoms in each R" being within the range of 1 to about 10 and the total number of carbon atoms in each molecule of the sulfone diluent being 2 to about 12, with the proviso that the two R"s, together, can represent an alkylene radical having 4 to about 12 carbon atoms in a cyclic sulfone having at least 4 carbon atoms in the heterocyclic ring.

Examples of some sulfone diluents that can be employed in the process of this invention include dimethyl sulfone, diethyl sulfone, diisopropyl sulfone, dibutyl sulfone, dihexyl sulfone, ethyl octyl sulfone, methyl decyl sulfone, dicyclohexyl sulfone, bis(3-methylcyclopentyl) sulfone, bis(cyclopentylmethyl) sulfone, diphenyl sulfone, propyl p-tolyl sulfone, methyl benzyl sulfone, tetramethylene sulfone (sulfolane), pentamethylene sulfone, hexamethylene sulfone, octamethylene sulfone, decamethylene sulfone, dodecamethylene sulfone, 2-methylhexamethylene sulfone, 3-ethylheptamethylene sulfone, 4-isopropyloctamethylene sulfone, 3-pentylpentamethylene sulfone, 2-octyltetramethylene sulfone, and the like, and mixtures thereof.

The aromatic sulfide/sulfone polymers produced by the process of this invention can be characterized as having recurring

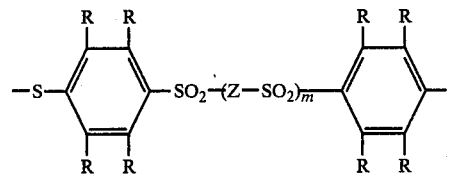

units, where each R, Z, and m is as defined above.

Although the mole ratio of dihalo aromatic sulfone to alkali metal sulfide can vary over a considerable range, generally it will be within the range of about 0.9:1 to about 2:1, preferably about 0.95:1 to about 1.2:1. The mole ratio of alkali metal carboxylate to alkali metal sulfide can vary over a wide range but generally will be within the range of about 0.05:1 to about 4:1, preferably about 0.1:1 to about 2:1. The amount of sulfone diluent can vary greatly, generally being within the range of about 100 grams to about 2500 grams per gram-mole of alkali metal sulfide.

Although the reaction temperature at which the polymerization is conducted can vary over a considerable range, generally it will be within the range of about 170° C. to about 240° C, preferably about 180° C to about 220° C. The reaction time can vary widely, depending in part on the reaction temperature, but generally will be within the range of about 10 minutes to about 3 days, preferably about 1 hour to about 8 hours. The pressure should be sufficient to maintain the dihalo aromatic sulfone and sulfone diluent substantially in the liquid phase.

It is to be understood that the process of this invention can be carried out by mixing the dihalo aromatic sulfone, the alkali metal sulfide, the alkali metal carboxylate, and the sulfone diluent in any order. It is also to be understood that a composite can be formed of any two or more of these substances with the remaining substance or substances being introduced into the composite. Furthermore, it is to be understood that these substances can be employed in the form of aqueous mixtures or hydrates and that subsequent to any step of contacting substances, water can be removed from the resulting composition, e.g., by heating, distilling, and the like. For instance, water can be removed by distillation from a mixture of the sulfone diluent, the alkali metal carboxylate, e.g., in anhydrous form or as a hydrate, and the alkali metal sulfide in hydrated form or as an aqueous mixture, after which the residual mixture can be admixed with the dihalo aromatic sulfone and the resulting mixture then maintained at polymerization conditions. In a presently preferred embodiment, the dihalo aromatic sulfone, the alkali metal sulfide, the alkali metal carboxylate, and the sulfone diluent are combined to form a mixture which is heated at an elevated temperature for a period of time sufficient to form an aromatic sulfide/sulfone polymer.

The aromatic sulfide/sulfone polymers produced by the process of this invention can be separated from the reaction mixture by conventional procedures, e.g., by filtration of the polymer, followed by washing with water, or by dilution of the reaction mixture with water, followed by filtration and water washing of the polymer. If desired, at least a portion of the washing with water can be conducted at an elevated temperature, e.g., up to about 250° C. Optionally, the washing with water can be used in conjunction with washing with a water-miscible solvent such as methanol.

The aromatic sulfide/sulfone polymers produced by the process of this invention can be blended with fillers, pigments, extenders, other polymers, and the like. They can be cured through crosslinking and/or chain extension, e.g., by heating at temperatures up to about 480° C in the presence of a free oxygen-containing gas, to provide cured products having high thermal stability and good chemical resistance. They are useful in the production of coatings, films, molded objects, and fibers.

EXAMPLES

In the following Examples, values for inherent viscosity were determined at 30° C in a 3:2 mixture, by weight, of phenol and 1,1,2,2-tetrachloroethane at a polymer concentration of 0.5 g/100 ml solution. Values for glass transition temperature ($T_g$) were determined on premelted and quenched polymer samples by differential thermal analysis. The values for polymer-melt temperature (PMT) were determined by placing portions of the polymer on a heated bar with a temperature gradient. The name poly(p-phenylene sulfide/sulfone) is used to describe an aromatic sulfide/sulfone polymer having recurring

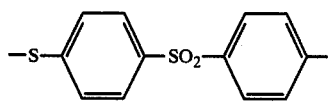

units in the polymer molecule.

EXAMPLE I

In a control run outside the scope of this invention, 65.2 g (60 percent assay, 0.5 mole) sodium sulfide, 0.2 g sodium hydroxide (to react with sodium bisulfide and sodium thiosulfate present in trace amounts in the sodium sulfide), 200.0 g sulfolane, and 143.6 g (0.5 mole) bis(p-chlorophenyl) sulfone were charged to a stirrer-equipped, 1-liter autoclave, which was then flushed with nitrogen. The resulting mixture was heated for 5 hours at 200° C at a pressure of 60–105 psig. The reaction product was washed eight times with hot water and dried to obtain a yield of 120.5 g of amorphous poly(p-phenylene sulfide/sulfone) having an inherent viscosity of 0.33, a $T_g$ of 192° C, and a PMT of 295° C.

EXAMPLE II

In a run within the scope of this invention, 65.2 g (60 percent assay, 0.5 mole) sodium sulfide, 0.2 g sodium hydroxide (to react with sodium bisulfide and sodium thiosulfate present in trace amounts in the sodium sulfide), 51.0 g (0.5 mole) lithium acetate dihydrate, 200.0 g sulfolane, and 143.6 g (0.5 mole) bis(p-chlorophenyl) sulfone were charged to a stirrer-equipped, 1-liter autoclave, which was then flushed with nitrogen. The resulting mixture was heated for five hours at 200° C at a pressure of 50–90 psig. The reaction product was washed twice with hot water, twice with hot methanol, and then four more times with hot water. The resulting product was dried to obtain a yield of 122.0 g of amorphous poly(p-phenylene sulfide/sulfone) having an inherent viscosity of 0.39, a $T_g$ of 208° C, and a PMT of 295° C.

Thus, based on inherent viscosity, the poly(p-phenylene sulfide/sulfone) produced in this Example was of substantially higher molecular weight than that produced in Example I in which lithium acetate dihydrate was not employed.

I claim:

1. A process for the production of high molecular weight aromatic sulfide/sulfone polymers which consists essentially of contacting:
   (a) at least one dihalo aromatic sulfone,
   (b) at least one alkali metal sulfide selected from the group consisting of sodium sulfide, potassium sulfide, rubidium sulfide, and cesium sulfide,
   (c) at least one alkali metal carboxylate, and
   (d) a sulfone diluent represented by the formula R"SO$_2$R" wherein each R" is a hydrocarbyl radical having from 1 to 10, inclusive, carbon atoms and the total number of carbon atoms in each molecule ranges from 2 to about 10 with the further proviso that the two R"s, together, can represent an alkylene radical having from 4 to about 12 carbon atoms in a cyclic sulfone having at least 4 carbon atoms in the heterocyclic ring, under polymerization conditions for a period of time sufficient to form an aromatic sulfide/sulfone polymer.

2. A process according to claim 1 wherein (a) is represented by the formula

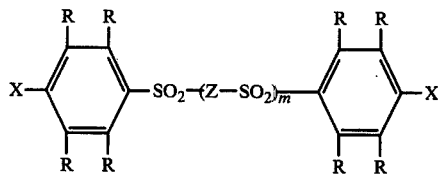

where each X is selected from the group consisting of fluorine, chlorine, bromine, and iodine; Z is a divalent radical selected from the group consisting of

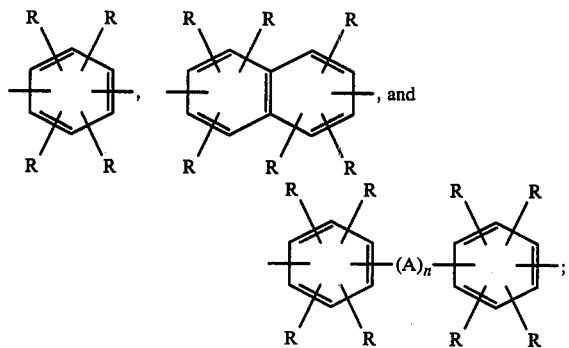

$m$ is 0 or 1; $n$ is 0 or 1; A is selected from the group consisting of oxygen, sulfur, sulfonyl, and CR$_2$; and each R is selected from the group consisting of hydrogen and alkyl radicals having 1 to about 4 carbon atoms, the total number of carbon atoms in all of the R groups in the molecule being 0 to about 12, and
   (c) is represented by the formula R'CO$_2$M wherein R' is a hydrocarbyl radical having from 1 to about 20 carbon atoms and M is an alkali metal.

3. A process according to claim 1 wherein $m$ is 0 and (a) is represented by the formula

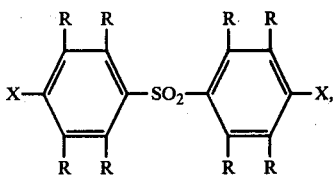

where each X is selected from the group consisting of fluorine, chlorine, bromine, and iodine, and each R is selected from the group consisting of hydrogen and alkyl radicals having 1 to about 4 carbon atoms, the total number of carbon atoms in all of the R groups being within the range of 0 to about 12, and (c) is represented by the formula R'CO$_2$M wherein R' is a hydrocarbyl radical having from 1 to about 20 carbon atoms and M is an alkali metal.

4. A process according to claim 1 wherein the temperature of the reaction is in the range of about 170° C to about 240° C under sufficient pressure to maintain liquid phase conditions and further wherein the mole ratio of (a) to (b) is in the range of 0.9:1 to 2:1, the mole ratio of (c) to (b) is in the range of 0.05:1 to 4:1, and the amount of (d) present is about 100 grams to about 2500 grams per gram-mole of (b).

5. A process according to claim 1 wherein
(a) is bis(p-chlorophenyl) sulfone,
(b) is sodium sulfide,
(c) is lithium acetate dihydrate, and
(d) is tetramethylene sulfone.

6. A process according to claim 1 wherein the temperature of the reaction is in the range of about 170° C to about 240° C and under sufficient pressure to maintain liquid phase conditions and further wherein the mole ratio of (a) to (b) is about 0.95:1 to about 1.2:1.

* * * * *